Aug. 18, 1936.  W. E. OWEN  2,051,152
HANDLE SECURING MEANS FOR TOOLS AND IMPLEMENTS
Filed May 28, 1935
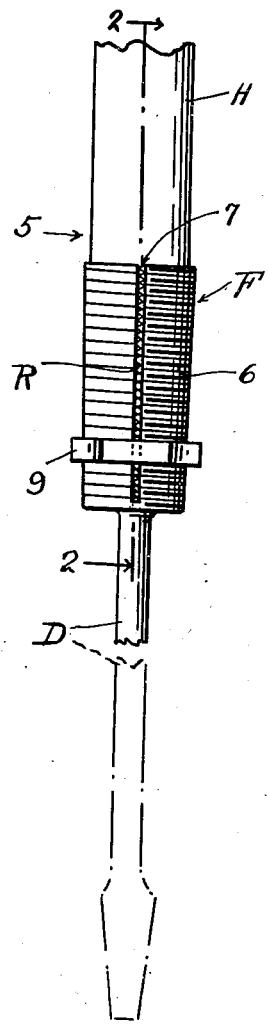
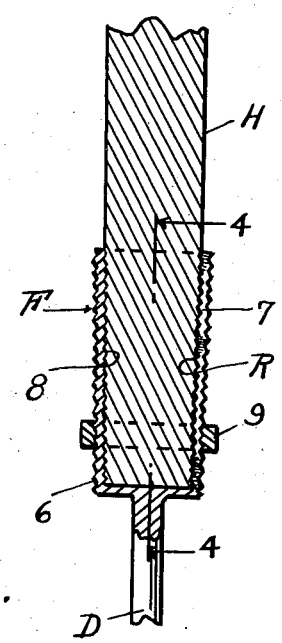
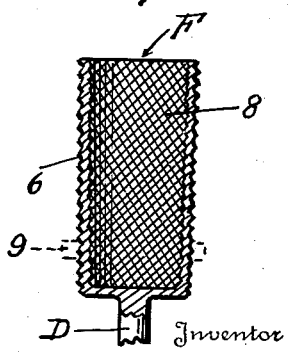
Inventor
Walter E. Owen
By L. B. James
Attorney Patented Aug. 18, 1936

2,051,152

UNITED STATES PATENT OFFICE 2,051,152

HANDLE SECURING MEANS FOR TOOLS AND IMPLEMENTS

Walter E. Owen, Chillicothe, Ohio

Application May 28, 1935, Serial No. 23,900

2 Claims. (Cl. 306—29)

This invention relates to tools and implements and more particularly to means for securing the same to the handles thereof.

The primary object of this invention resides in the provision of a tool or implement provided with means whereby it can be readily secured to a handle without boring the same or reducing its strength.

Another object of this invention resides in the provision of a tool or implement provided with means whereby it can be removably secured to a particularly constructed handle.

A further object of this invention resides in the provision of a tool or implement provided with means whereby rigidity thereof with its handle is maintained.

A still further object of this invention resides in the provision of a tool or implement provided with means whereby looseness between the tool and handle can be taken up should the handle shrink.

In addition to the foregoing objects this invention resides in the provision of a tool or implement provided with means for connecting it to a handle having a tapering end in such manner that displacement therefrom is obviated.

With these and other objects in view this invention resides in certain novel features of construction and arrangement of elements to be hereinafter fully set forth in the specification, illustrated in the accompanying drawing and pointed out in the appended claims and, while this disclosure depicts my present conception of the invention, the right is reserved to resort to such changes in construction as come within the scope of the claims.

In the accompanying drawing forming a part of this application:

Fig. 1 is a side view of a tool constructed in accordance with this invention.

Fig. 2 is a sectional view on line 2—2 of Fig. 1.

Fig. 3 is a detail side view of the handle per se.

Fig. 4 is a sectional view approximately on line 4—4 of Fig. 2, the handle being removed and the nut being shown in dotted lines.

In the present embodiment of this invention the numeral 5 designates, in general, a tool which is herein shown in the form of a screw-driver; however, since other tools or implements may be constructed to similarly coact with their handles in securing the same thereto, it is within the purview of this invention to so adopt the invention to numerous types of tools or implements having handles similar to that herein illustrated.

Integrally formed or otherwise secured to the shank of the tool D is tubular tapering socket F which is threaded as at 6 on its outer periphery and roughened on its inner periphery as at 8, said tubular socket is preferably slit as at 7 throughout its length to permit contraction as a nut or other suitable element 9 is screwed thereon toward its larger end.

Connected to the tool or implement through the instrumentality of the socket F and nut 9 is a handle H having a tapered roughened portion R adapted to be seated in the socket and clamped into engagement with the roughened interior surface of the socket through contraction thereof as the nut 9 is screwed toward the larger end of the socket, thus it will be observed that, although the socket and terminal of the handle are tapered, the socket will not slide off the handle as the nut is tightened.

With this invention fully set forth it is manifest that means are provided whereby tools or implements of various types can be removably connected to a particularly constructed handle and, through the instrumentality of a nut of given diameter threaded on a tapering slit socket, rigidity of the tool or implement relative to the handle is maintained.

Having fully described this invention what I claim and desire to protect by Letters Patent is:

1. In a tool of the character set forth the combination of a handle having a tapered portion roughened throughout its entire area, a tapered socket having a roughened bore of an area equal to that of the tapered portion of the handle, said tapered socket having a single slit therein extending from the base of the bore to the larger end of the socket, external threads formed on the tapered socket and extending from the smaller to the larger end thereof, and a nut of a diameter approximately equal to the smaller diameter of the tapering socket threadedly engaging the threads of the socket.

2. In a tool of the character set forth the combination of a handle having a tapered portion roughened throughout its entire area, a tapered socket having its smaller end closed and its bore roughened an area substantially equal to that of the tapered portion of the handle, said tapered socket having a single slit therein extending from the closed end of the bore to the larger end of the socket, external threads formed on the tapered socket and extending from the smaller to the larger end thereof, a nut of a diameter approximately equal to the smaller diameter of the tapered socket threadedly engaging the threads of the socket, and a tool integrally formed on the closed end of the socket in axial alignment with the bore of the socket.

WALTER E. OWEN.